(12) United States Patent
Jambavalikar et al.

(10) Patent No.: US 12,363,070 B2
(45) Date of Patent: Jul. 15, 2025

(54) MANAGEMENT SERVICE DOMAIN JOIN ORCHESTRATION

(71) Applicant: Omnissa, LLC, Mountain View, CA (US)

(72) Inventors: Ameya Jambavalikar, Atlanta, GA (US); Dipak Mahajan, Alpharetta, GA (US); Ryan Stallings, Atlanta, GA (US)

(73) Assignee: Omnissa, LLC, Mountain View, CA (US)

( * ) Notice: Subject to any disclaimer, the term of this patent is extended or adjusted under 35 U.S.C. 154(b) by 827 days.

(21) Appl. No.: 17/485,668

(22) Filed: Sep. 27, 2021

(65) Prior Publication Data
US 2023/0109387 A1   Apr. 6, 2023

(51) Int. Cl.
*H04L 9/40*   (2022.01)
(52) U.S. Cl.
CPC .......... *H04L 63/0209* (2013.01); *H04L 63/08* (2013.01)

(58) Field of Classification Search
CPC .... H04L 63/0209; H04L 63/08; G06Q 50/265
See application file for complete search history.

(56) References Cited

U.S. PATENT DOCUMENTS

| 9,813,303 | B1 * | 11/2017 | Guigli | H04L 61/5014 |
| 2006/0123472 | A1 * | 6/2006 | Schmidt | H04L 63/0815 726/8 |
| 2008/0104212 | A1 * | 5/2008 | Ebrom | G06Q 10/06 714/E11.202 |

* cited by examiner

*Primary Examiner* — Huan V Doan
(74) *Attorney, Agent, or Firm* — Kim & Stewart LLP

(57) ABSTRACT

Disclosed are various examples of management service based device platform creation and device configuration. In some examples, a domain join configuration is identified. The configuration can include a device name format and a domain server identifier of a domain server. Instructions to create a device object using an enterprise directory service are transmitted to a management connector service within an enterprise firewall. A domain join blob is received. The domain join blob is transmitted to a device to enable the device to join a domain of the domain server.

17 Claims, 5 Drawing Sheets

MANAGEMENT SERVICE DOMAIN JOIN ORCHESTRATION

BACKGROUND

An endpoint management service can manage a variety of types of devices and endpoints, including client devices, Internet-of-Things (IoT) devices, and other types of devices. Endpoint management services can be adept at providing access to Internet-based resources. However, setting up devices to join a domain can require changes to enterprise-managed resources within the domain itself. The traditional process of connecting devices to enterprise-specific domains and intranets can be a manual process rather than one that is handled by endpoint management.

The process can be difficult and time consuming. The endpoint management service can lack a management tool or interface to define and affect the necessary components to provide domain join setup and configuration for new devices. Further, the traditional process can be difficult for bring-your-own device (BYOD) scenarios, since the end user can lack the ability to affect the enterprise-managed resources, and enterprise administrators can lack the device-specific information. There is a need for improved domain join orchestration for management services.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to domain join orchestration using management service integrations. An endpoint management service can manage a variety of types of client devices, endpoints, Internet-of-Things (IoT) devices, and other types of devices. However, setting up devices to join a domain of an enterprise-specific intranet or on-premises network can require changes to enterprise-managed resources within the domain itself. The traditional process of connecting devices to enterprise-specific domains and intranets can be a time consuming manual process that is difficult for end users and enterprise information technology administrators alike. As a result, there is an increasing need for a more efficient and extensible solution for domain join orchestration using management service integrations.

Figure 1:
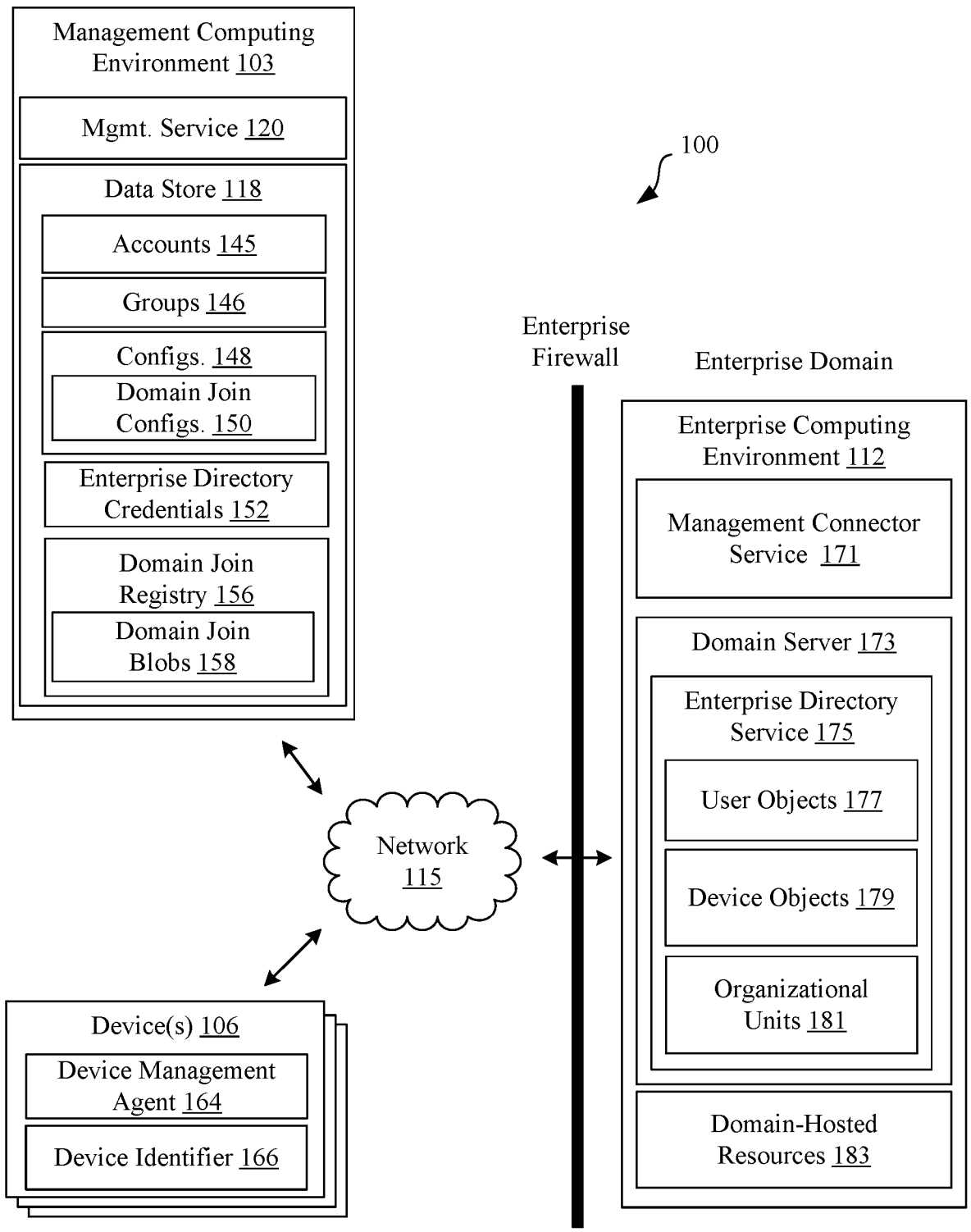
FIG. 1 is a drawing of a networked environment including components that provide management service domain join orchestration, according to the present disclosure.

With reference to FIG. 1, shown is an example of a networked environment 100. The networked environment 100 can include one or more management computing environments 103, one or more devices 106, and an enterprise computing environment 112 in communication with one another over a network 115.

The network 115 can include wide area networks (WANs) and local area networks (LANs). These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FIR), BLUETOOTH® networks, microwave transmission networks, as well as other networks relying on radio broadcasts. The network 115 can also include a combination of two or more networks 115. Examples of networks 115 can include the Internet, intranets, extranets, virtual private networks (VPNs), and similar networks.

The management computing environment 103 can include, for example, a server computer, or any other system providing computing capability. Alternatively, the management computing environment 103 can include a plurality of computing devices that are arranged, for example, in one or more server banks, computer banks, or other arrangements. The management computing environments 103 can include a grid computing resource or any other distributed computing arrangement. The computing devices can be located in a single installation or can be distributed among many different geographical locations.

The management computing environments 103 can also include or be operated as one or more virtualized computer instances. For purposes of convenience, the management computing environment 103 is referred to herein in the singular. Even though the management computing environment 103 is referred to in the singular, it is understood that a plurality of management computing environments 103 can be employed in the various arrangements as described above. As the management computing environment 103 communicates with the device 106 remotely over the network 115, the management computing environment 103 can be described as a remote management computing environment 103.

Various applications can be executed in the management computing environment 103. For example, each management computing environment 103 can include a management service 120 that includes a device management console, as well as other applications that may be executed in the management computing environment 103. Various data is stored in one or more data stores 118 that are accessible to the management computing environment 103. The data store 118 may be representative of a plurality of data stores 118, which can include relational databases, object-oriented databases, hierarchical databases, hash tables or similar key-value data stores, as well as other data storage applications or data structures. The data stored in the data store 118 is associated with the operation of the various applications or functional entities described below. This data can include one or more device records, compliance rules for devices, accounts 145, groups 146, configurations 148, domain join configurations 150, enterprise directory credentials 152, a domain join registry 156, domain join blobs 158, as well as potentially other data.

The accounts 145 can include user accounts, device accounts, virtual device accounts, and other accounts with the management service 120. The groups 146 can include user groups, device groups, and other groups of accounts 145. The configurations 148 can include settings, commands, actions, and other device-specific configurations for devices 106. For example, if a device 106 is a client device 106, the device-specific configurations can include management profiles, policies, and security baselines that require or prohibit certain specified states, applications, and other device configurations for the device 106. An IoT device 106 can further specify certain sensor information or metrics to collect and actions to perform periodically and according to various schedules. The configurations 148 can also include domain join configurations 150.

The groups 146 can refer to a group of accounts 145 with the management service 120, or a group 146 to which accounts 145 and devices 106 can be assigned. User and device groups 146 can be created by an administrator of the management service 120 such that a batch of devices 106, or a set of users logging in to use a device 106 for enterprise purposes, can be configured according to common settings. For instance, an enterprise can create a group 146 for the marketing department and the sales department, where the devices 106 in the marketing department are configured differently from the devices 106 in the sales department. Groups 146 can include subgroups such as managers within the marketing department, or programming leads in a program development department.

The domain join configuration 150 can include information utilized by a device 106 in order to join an enterprise domain by communications with the domain server 173 device within the enterprise computing environment 112. For example, the domain join configuration 150 can include a domain join blob 158, on-premises domain server address or identifier, domain organizational unit information, a machine or device name format, and other domain join data. The domain join blob 158 can include a device-specific file such as a text file or another file that includes a 64-bit encoded blob that enables a device 106 to join the enterprise domain.

Enterprise directory credentials 152 can include username and password, tokens, and other information that can be used to authenticate with the enterprise directory service 175 of the domain server 173. The enterprise directory service 175 can include an enterprise-operated directory service such as Windows® Active Directory®, Azure®, FreeIPAR, OpenLDAP®, and other services. The enterprise directory credentials 152 can be credentials that include permissions to create enterprise directory organizational units 181 within the enterprise directory service 175. The enterprise directory service 175 can include an enterprise-operated directory service that enables creation of enterprise directory organizational units 181 based on authentication using the enterprise directory credentials 152.

The domain join registry 156 can include a registry of domain join blobs 158 mapped to devices 106. A domain join blobs 158 can enable a device 106 to join an enterprise domain by communications with the enterprise directory service 175 or the domain server 173. Domain join configurations 150 can include the domain join blob 158, on-premises domain server address or identifier, domain organizational unit information, a machine or device name format, and other information. This information can be associated with one or more devices 106.

The device 106 can be representative of one or more devices that may be connected to the network 115. Examples of devices 106 include processor-based systems, such as desktop computers, laptop computers, a personal digital assistant, a cellular telephone, a smartphone, a tablet computer system, smart speakers or similar headless devices, or any other device with like capability. Examples of devices 106 can also include IoT devices and sensors that collect and report sensor samples. Devices 106 can collect and report samples that include device internal and device external sensor values, internal hardware usage data, and other information. The device 106 can also be equipped with networking capability or networking interfaces, including a localized networking or communication capability, such as a near-field communication (NFC) capability, radio-frequency identification (RFID), Bluetooth, Wired Bacnet, Thread, Zigbee, read write capability, and other localized networking and communication capabilities.

The device 106 can include an operating system. The operating system can be configured to execute various client applications. Examples of operating systems include MICROSOFT WINDOWS®, APPLE macOS®, APPLE IOS®, GOOGLE ANDROID®, and various distributions of Linux. The client applications can include web browsers, enterprise applications, social networking applications, word processors, spreadsheet applications, and media viewing applications.

The enterprise computing environment 112 can include, for example, a server computer, or any other system providing computing capability that is operated by a tenant or enterprise that employs the management service 120. The enterprise computing environment 112 can include a plurality of computing devices that are arranged, for example, in one or more server banks, computer banks, or other arrangements. The enterprise computing environment 112 can include a grid computing resource or any other distributed computing arrangement. The computing devices can be located in a single installation or can be distributed among many different geographical locations. The enterprise computing environment 112 can be operated by a third-party service with respect to the management computing environments 103; alternatively, the enterprise computing environment 112 can be affiliated with and part of one or more management computing environments 103.

The enterprise computing environment 112 can include one or more physical devices including a domain server 173 device and other devices 106. The devices 106 of the enterprise computing environment 112 can provide a management connector service 171, an enterprise directory service 175, and domain-hosted resources 183. A single device 106 can provide multiple ones of these functionalities, and multiple devices 106 can provide a single one of these functionalities, in various implementations.

The enterprise computing environment 112 can include one or more data stores storing data that includes the management connector service 171, enterprise directory service 175, and domain-hosted resources 183. The enterprise computing environment 112 can also store tokens, certificates, credentials, and other authentication data that the management connector service 171 can utilize for authentication with the management service 120. The domain server 173 can include a server computer device that controls access to a set of domain-hosted resources 183 of the enterprise computing environment 112 in conjunction with the enterprise directory service 175. The domain-hosted resources 183 that are provided can be different based on permissions for different users corresponding to the user objects 177, different machines or devices corresponding to the device objects 179, as well as organizational units 181.

The management service 120 can provide management for multiple tenants, which can refer to enterprises that employ the management service 120. The management service 120 can authenticate various tenants using tenant authentication credentials such as a tenant-specific certificate, tenant-specific usernames and passwords, and others. Once authenticated, the management service 120 can provide a device management console user interface that enables a specific enterprise or tenant to manage a set of devices 106 that are registered in association with the enterprise.

The management service 120 can be executed to oversee the operation of devices 106, virtual devices, and other endpoints. The management service 120 can be referred to as a unified endpoint management (UEM) service and more generally as a management service. Managed devices 106 can be enrolled with the management service 120. Virtual devices can include virtual machines and other virtual components that provide desktop, application, or desktop and application services that are accessed by the devices 106. An enterprise, such as a company, enterprise, or other entity, can operate the management service 120 to oversee or manage the operation of the devices 106 of its employees, contractors, customers, or other users having accounts 145 with the enterprise. The management service 120 can further cause device records, groups 146, and accounts 145 to be created, modified, or removed from the data store 118. Each enterprise tenant can include a logically separate group of accounts 145, groups 146, configurations 148, device discovery data, and compliance rules. As a result, this information can be tenant-specific with respect to a tenant and an identifier of the tenant such as a tenant account, a tenant email domain or address, and other information.

The management connector service 171 can include an enterprise-hosted service or component that operates in conjunction with the management service 120. The management connector service 171 can include a headless service that exposes application programming interfaces (APIs) for communications with the management service 120, and also for communications with devices 106.

The device management agent 164 can include instructions executed using the device 106 that are configured to communicate with the management service 120. The device management agent 164 can perform enrollment of the device 106 with the management service 120, as well as configuration of the device 106 to join an enterprise domain controlled by the domain server 173 of the enterprise computing environment 112. The device identifier 166 can be a manufacturer-assigned or enterprise-assigned device identifier, such as a serial number for the device 106. The device management agent 164 can periodically check in with the management service 120 and can retrieve commands to perform against the device 106. The commands can be retrieved from a command queue maintained by the management service 120 for the device 106 or a group of devices 106. The commands can include a command to apply a domain join configuration 150 and a domain join blob 158.

There can be multiple layers of authentication for device and management service integration using a management connector service 171. One layer can include service to service authentication between the services, including the management service 120 and the management connector service 171. Service to service authentication can be accomplished using certificate mutual authentication where the services exchange signed certificates to authenticate each other. Tenant authentication can be accomplished using token service tokens. Device 106 to management service 120 authentication can use hash-function-based message authentication code (HMAC) tokens. However, other authentication methods and paradigms can also be utilized.

Figure 2:
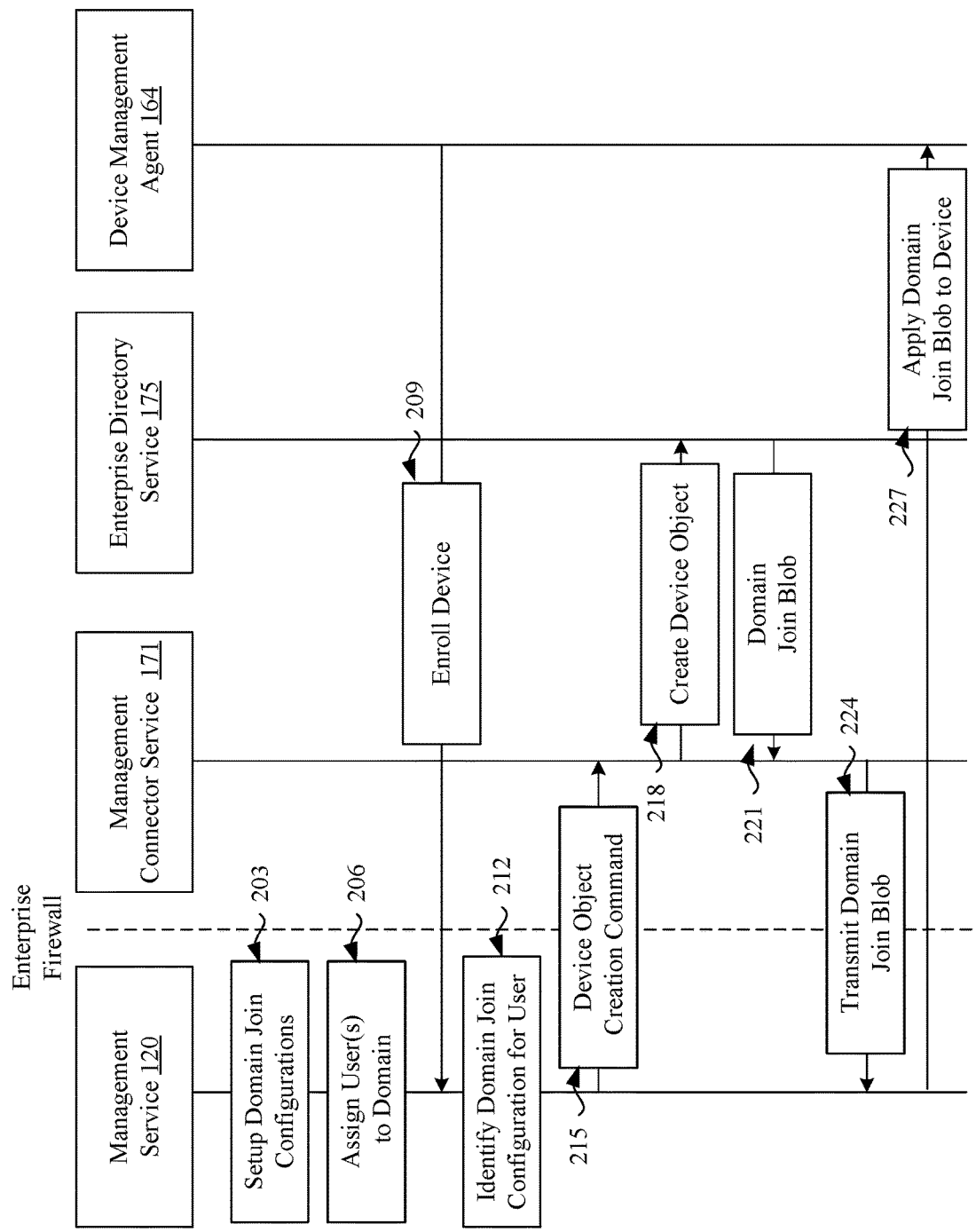
FIG. 2 is a sequence diagram depicting an example of functionalities performed by components of the networked environment for management service domain join orchestration, according to the present disclosure.

FIG. 2 provides an example of functionalities performed by components of the networked environment 100 for domain join orchestration using management service integrations. Generally, this figure shows how the management service 120 directs a process that enables on-demand enrollment, domain registration and domain join configuration for bring your own device (BYOD) scenarios. This process is also useful for any scenario where the device 106 information is unknown to an administrator of the enterprise devices 106. While each of the steps can be described as performed by a particular component, other components of the networked environment 100 can perform some aspects of the functionalities described.

In step 203, the management service 120 can setup a domain join configuration 150. The management service 120 can generate a console user interface through which an administrator user can create and assign a domain join configuration 150 to one or more users according to user objects 177 and accounts 145. The domain join configuration 150 can include communication information such as a domain server address or identifier, domain organizational unit information, a machine or device name format, domain type, domain protocol, domain protocol version, and other information.

The console user interface of the management service 120 can include a user interface element that identifies a friendly name or identifier for the domain join configuration 150 as a whole. A user can type or enter this identifier, and the management service 120 can check to ensure uniqueness. A single enterprise can include multiple on-premises domains in a single location, as well as on-premises domains across multiple locations.

The console user interface of the management service 120 can include a user interface element that identifies a domain type. The domain type can specify a type of domain associated with a particular enterprise directory service 175 and version, such as on-premises Active Directory®, on-premises Active Directory® federated with Azure®, FreeIPAR, OpenLDAP®, LDAP-based Active Directory®, or LDAP-based directory service or another type of domain. The domain type can include a protocol, a software utilized, or both. A domain protocol can include LDAP and others. A version of the protocol or version of the domain type can also be provided.

A user can enter the domain type through the user interface element, the field can be auto-filled using a domain type utilized by the enterprise, or the user can select the domain type from a list. The list can be populated using a set of domain types supported by the management service 120. The list can also be populated to include a set of domain types utilized by the enterprise. The management service 120 can query a portion of the data store 118 to identify the set of domain types from domain information provided or entered for the enterprise for other enterprise management purposes.

The console user interface of the management service 120 can include a user interface element that identifies a domain server identifier. The domain server identifier can include an Internet Protocol (IP) address, a Uniform Resource Link (URL), a Uniform Resource Identifier (URI), or another network address or portion of a network address that can be utilized for communications with a domain server 173. The domain server identifier can also include a friendly identifier that is associated with communication information such as the network address for communications with a domain server 173. A user can enter the domain server identifier through the user interface element, the field can be autofilled using a domain server utilized by the enterprise, or the user can select the domain server identifier from a list of domain server identifiers utilized by the enterprise. The management service 120 can query a portion of the data store 118 to identify the set of domain server identifiers from domain information provided or entered for the enterprise for other enterprise management purposes. A user can select a friendly name from a list of friendly names for domain servers, and associated communication information or another domain server identifier can be automatically filled in the user interface.

The console user interface of the management service 120 can include a user interface element that identifies a device name format for the domain join configuration 150. The device name format can be a format that is supported by the enterprise directory service 175. The device name format can be a format that is used for device objects 179 maintained by the enterprise directory service 175, or any user-specified format associated with the particular domain join configuration 150. The device name format can enable the management service 120, the management connector service 171, or the enterprise directory service 175 to generate appropriately formatted unique identifiers for each device 106 that is ultimately assigned to use the domain join configuration 150.

The console user interface of the management service 120 can include a user interface element to specify whether a DNS server is enabled or disabled; an encryption type, a version of a protocol; whether server account credentials are enabled or disabled; an authentication type such as anonymous, basic, digest, Kerberos, New Technology LAN Manager (NTLM), or GSS-Negotiate among others; a username, password, and other enterprise directory credentials capable of creating device objects 179 and verifying user objects 177 and organizational units 181 using the enterprise directory service 175. The management service 120 can use all of this information to create a domain join configuration 150.

In step 206, the management service 120 can associate users with the domain join configuration 150. The console user interface of the management service 120 can generate a user interface element that can enter or select user objects 177, organizational units 181, accounts 145, and groups 146. The groups 146 can include a logical group that matches an organizational unit 181 maintained and stored by the enterprise directory service 175. However, the groups 146 can also include other logical groupings of accounts 145. Accounts 145 can include management service-maintained accounts that are mapped to user objects 177 maintained and stored by the enterprise directory service 175.

In step 209, the management service 120 can receive an enrollment request from a device management agent 164 executed by the device 106. A user can enroll a new device 106 such as a BYOD device 106 or any device 106. The user can download and install the device management agent 164 and proceed with an enrollment process. The device management agent 164 can provide instructions and direct the user to enroll the device 106 with user credentials associated with the enterprise directory service 175 and a user object 177. Alternatively, the user credentials can be management service account credentials. The user can enter the specified credentials during the enrollment process. The enrollment request can identify a user that is logged in to the device 106 using the credentials. The enrollment request can also provide the device identifier 166. The device management agent 164 can identify the device identifier 166 by data stored in the device 106 or by querying an operating system. The device management agent 164 can identify the device identifier 166 based on user entry.

The management service 120 can communicate with the management connector service 171, to check whether the enterprise directory credentials are associated with a user object 177 maintained by the enterprise directory service 175. The management connector service 171 can query the enterprise directory service 175 using the enterprise directory credentials and return a response that indicates or specifies whether the user is a valid user associated with a user object 177 in the enterprise directory.

The management service 120 is incapable of initiating transmissions from outside the enterprise firewall to the management connector service 171 within the enterprise computing environment. However, the management connector service 171 can be capable of outbound communications from within the enterprise firewall to the management service 120. The management connector service 171 can check in with the management service 120 and retrieve a user verification command that includes the user's enterprise directory credentials. The management connector service 171 can use the enterprise directory service 175 to verify that the user credentials are associated with a user object 177 in the enterprise directory. The management connector service 171 can return a user verification message in response to the user verification command.

Once the management service 120 verifies that the user is a valid, the enrollment of the device 106 can proceed. The management service 120 can also create a new account 145 with the management service 120, or map the user's enterprise directory credentials to an existing user account 145. The management service 120 can associate the device identifier 166 with the account 145. The user can enter management service account user credentials in addition to or alternatively to enterprise directory user credentials. The credentials can be provided in the enrollment request.

In step 212, the management service 120 can identify the domain join configuration 150 for the user. The management service 120 can identify user credentials or a unique user identifier 166 received in the enrollment process. The management service 120 can setup or configure the device 106 based on the configurations 148 for the account 145 of that user. The management service 120 can setup or configure the device 106 based on the configurations 148 for the group 146 associated with the user or account 145. The configurations 148 can include one or more domain join configurations 150. In order to apply a domain join configuration 150 for a device 106 based on the account 145 or group 146, the device 106 can be associated with a computer object, machine object, or device object 179.

In step 215, the management service 120 can transmit a device object creation command to the management connector service 171. The management service 120 can place a device object creation command or request in a command queue. The management connector service 171 can check in with the management service 120 and retrieve the device object creation command from the command queue.

The object creation command can include instructions to create a device object 179 using the enterprise directory service 175. The object creation command can include information from the domain join configuration 150 such as a device name format, domain server communication information, and the domain server communication information can include or be identified using the information provided through the management console in step 203. The object creation command can alternatively include a device name generated by the management service 120 using the device name format.

In step 218, the management connector service 171 can create a device object 179 using the enterprise directory service 175. The management connector service 171 can implement the instructions provided in the object creation command from the management service 120. The management connector service 171 or the enterprise directory service 175 can create the device object 179 to have a device name corresponding to the device name format.

In step 221, the management connector service 171 can receive a domain join blob 158 from the enterprise directory service 175. The domain join blob 158 can be received once the device object 179 is created. The management connector service 171 can implement separate instructions that cause the enterprise directory service 175 to generate the domain join blob 158. The management service 120 can provide these instructions to the management connector service 171 through the command queue separately or along with the instructions to create the device object 179.

In step 224, the management connector service 171 can transmit the domain join blob 158 to the management service 120. The management connector service 171 can provide the domain join blob 158 along with a confirmation that the device object 179 is created by the enterprise directory service 175. The management service 120 can store the domain join blob 158 in the domain join registry 156, in association with the device 106. The domain join registry 156 can also include other information including the domain server 173 or enterprise directory service 175 associated with the domain join blob 158.

In step 227, the management service 120 can apply the domain join blob 158 to the device 106 using the device management agent 164. The management service 120 can transmit a command to apply the domain join blob 158 to the device 106. The management service 120 can place the command to apply the domain join blob 158 in a command queue for the device 106. The device management agent 164 can check in with the management service 120, retrieve the command, and implement it on the device 106.

The device 106 can then use the domain join blob 158 to join the domain and gain access to an associated set of domain-hosted resources 183. While the device 106 is shown within the enterprise firewall, the enrollment and application of the domain join blob 158 can be performed with the device 106 in any location in communication with the management service 120. Once the device 106 is connected to the enterprise computing environment 112 such as a private WAN, private LAN, or on-premises network, the device 106 can use the domain join blob 158 to join the domain.

Figure 3:
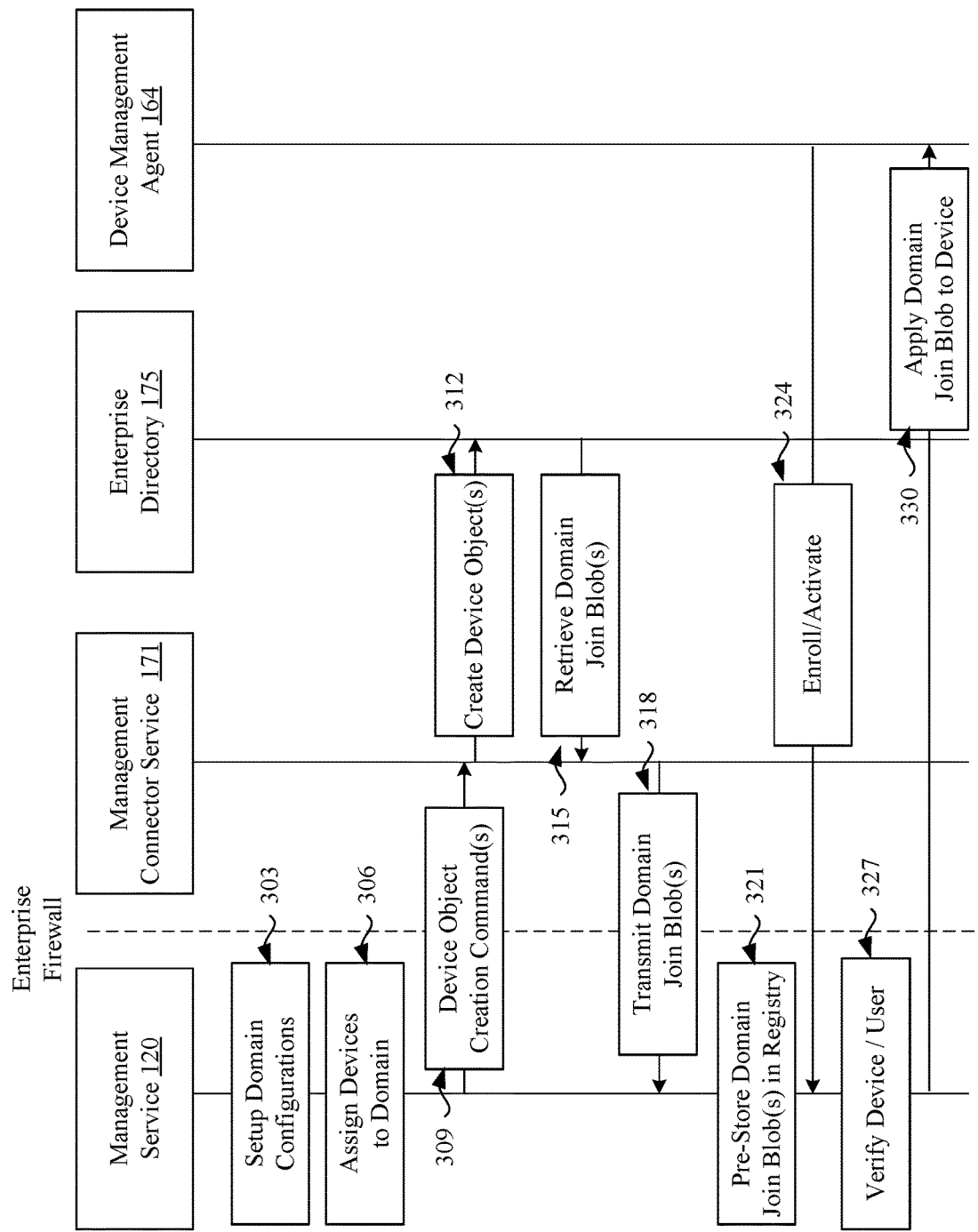
FIG. 3 is a sequence diagram depicting another example of functionalities performed by components of the networked environment for management service domain join orchestration, according to the present disclosure.

FIG. 3 provides an example of functionalities performed by components of the networked environment 100 for domain join orchestration using management service integrations. Generally, this figure shows how the management service 120 directs a process that enables on-demand enrollment, domain registration and domain join configuration for enterprise-provided devices and other scenarios where device information for each device 106 is known by enterprise administrators. While each of the steps can be described as performed by a particular component, other components of the networked environment 100 can perform some aspects of the functionalities described.

In step 303, the management service 120 can setup a domain join configuration 150. The management service 120 can generate a console user interface through which an administrator user can create and assign a domain join configuration 150 to one or more devices 106. The domain join configuration 150 can include communication information such as a domain server address or identifier, domain organizational unit information, a machine or device name format, and other information. A console user interface of the management service 120 can include user interface elements that can set up or configure the domain join configuration 150. This user interface is described in greater detail with respect to FIGS. 2, 4, and 5.

In step 306, the management service 120 can associate devices 106 with the domain join configuration 150. Each device 106 can include a device identifier 166. A list of device identifiers 166 can be entered or uploaded through a console user interface of the management service 120. The enterprise can purchase devices 106 for a particular organizational unit 181 or group 146 of the enterprise. An administrator can have access to a file-based or physical list of the device identifiers 166. The management service 120 can operate in concert with the management connector service 171 and other components of the networked environment 100 to pre-store domain join blobs 158 that can be retrieved upon activation and enrollment of the devices 106. The console user interface of the management service 120 can also generate a user interface element that can associate and select a group 146, an account 145, a user object 177, or an organizational unit 181 to which the device 106 is assigned.

In step 309, the management service 120 can transmit a device object creation command to create one or more device objects 179 to the management connector service 171. The management service 120 can place one or more commands in a command queue for the management connector service 171. The management connector service 171 can check in with the management service 120 and retrieve any commands from the command queue.

The device object creation command can include instructions to create multiple device objects 179 using the enterprise directory service 175. The object creation command can include information from the domain join configuration 150 such as a device name format, domain server communication information, and the domain server communication information can include or be identified using the information provided through the management console. The object creation command can alternatively include device names generated by the management service 120 using the device name format.

In step 312, the management connector service 171 can create one or more device objects 179 using the enterprise directory service 175. The management connector service 171 can implement the instructions provided in the object creation command from the management service 120. The management connector service 171 or the enterprise directory service 175 can create the device objects 179 to have device names that conform to the device name format.

In step 315, the management connector service 171 can receive domain join blobs 158 from the enterprise directory service 175. The domain join blob 158 can be received once the device object 179 is created. The management connector service 171 can implement separate instructions that cause the enterprise directory service 175 to generate the domain join blobs 158. The management service 120 can provide these instructions to the management connector service 171 through the command queue separately or along with the instructions to create the device objects 179.

In step 318, the management connector service 171 can transmit the domain join blob 158 to the management service 120. The management connector service 171 can provide the domain join blob 158 along with a confirmation that the device object 179 is created by the enterprise directory service 175.

In step 321, the management service 120 can pre-store the domain join blobs 158 in the domain join registry 156 in association with the device 106. The domain join registry 156 can also include other information including the domain server 173 or enterprise directory service 175 associated with the domain join blob 158. A group 146, organizational unit 181, user object 177 or account 145 can also be associated with the device 106 and the domain join blob 158 in the domain join registry 156.

In step 324, the management service 120 can receive an enrollment request from a device management agent 164 executed by the device 106. A user can receive the device 106 and activate it. The user can download and install the device management agent 164, or the device management agent 164 can be preinstalled and launched as part of an initial activation or out of box experience of the device 106. The device management agent 164 can provide instructions and direct the user to enroll the device 106 using user credentials such as enterprise directory user credentials or management service account user credentials. The user can enter the specified credentials during the enrollment process. The enrollment request can identify a user that is logged in to the device 106 using the credentials. The enrollment request can also provide the device identifier 166.

In step 327, the management service 120 can verify that the enterprise directory credentials are valid, and that the device identifier 166 is approved for the account 145, group 146, user object 177, or organizational unit 181 associated with the end user credentials. The management service 120 can perform the verification using data in the data store 118.

The management service 120 can also communicate with the management connector service 171 to verify whether enterprise directory credentials 152 are associated with a user object 177 maintained by the enterprise directory service 175. The management connector service 171 can query the enterprise directory service 175 using the enterprise directory credentials 152 and return a response that indicates and specifies whether the user is a valid user associated with a user object 177 in the enterprise directory. The management service 120 can also create a new account 145 with the management service 120 or map the user's enterprise directory credentials 152 to an existing user account 145. If the user is valid and approved to use the device 106, the process can proceed with enrollment and configuration of the device 106.

In step 330, the management service 120 can apply the domain join blob 158 to the device 106 using the device management agent 164. The management service 120 can identify and retrieve the domain join blob 158 from the domain join registry 156 based on the device identifier 166 of the enrollment request or device activation request. The device 106 can be preconfigured and pre-enrolled prior to initial activation.

The management service 120 can transmit a command to apply the domain join blob 158 to the device 106. The management service 120 can place the command to apply the domain join blob 158 in a command queue for the device 106. The device management agent 164 can check in with the management service 120, retrieve the command, and implement it on the device 106.

The device 106 can then use the domain join blob 158 to join the domain and gain access to an associated set of domain-hosted resources 183. While the device 106 is shown within the enterprise firewall, the enrollment and application of the domain join blob 158 can be performed with the device 106 in any location in communication with the management service 120. Once the device 106 is connected to the enterprise computing environment 112 such as a private WAN, private LAN, or on-premises network, the device 106 can use the domain join blob 158 to join the domain.

Figure 4:
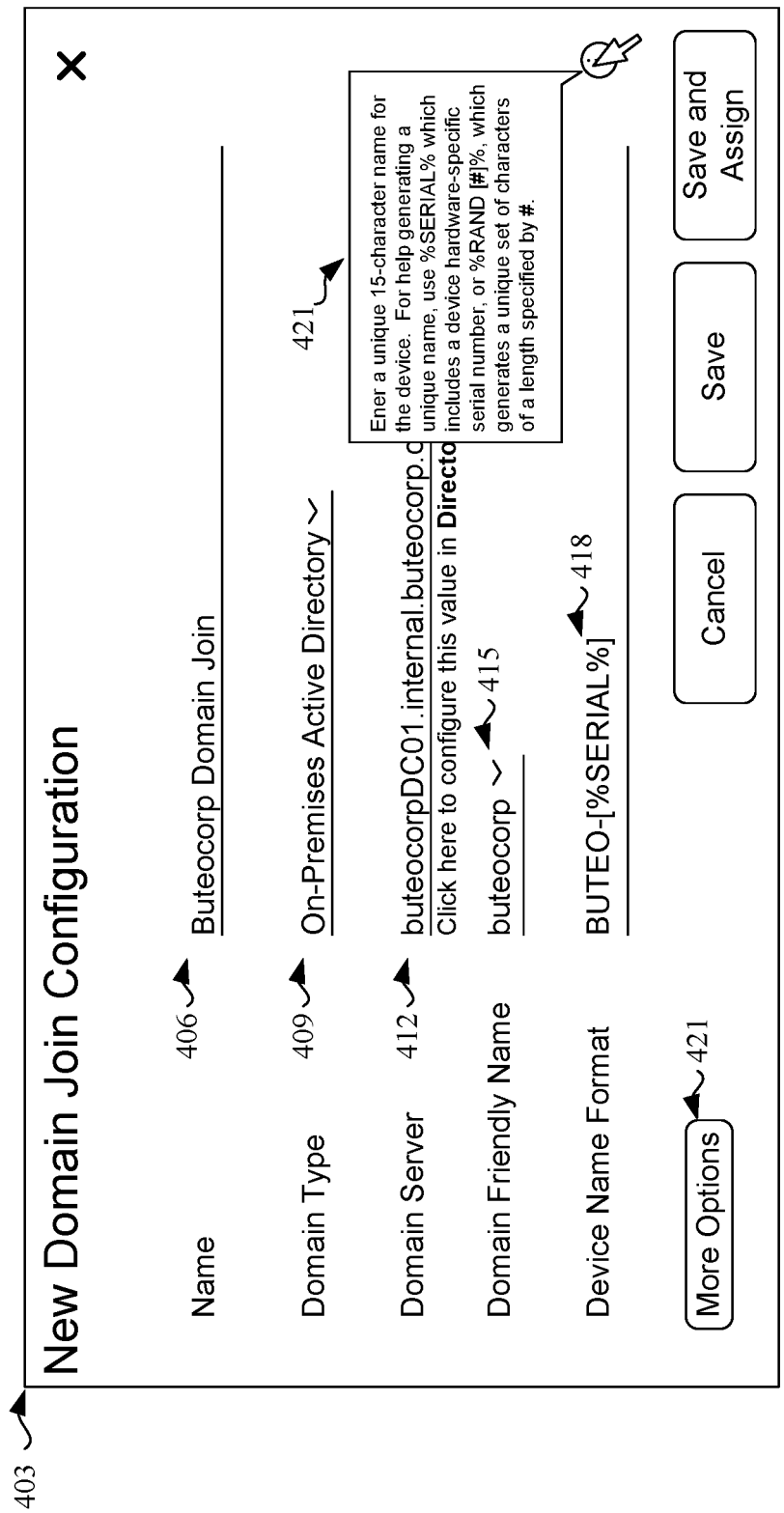
FIG. 4 is a drawing depicting an example of a user interface for management service domain join orchestration, according to the present disclosure.

FIG. 4 illustrates a domain join configuration user interface 403, which can be part of a console user interface of the management service 120. The domain join configuration user interface 403 can include a user interface element 406 that identifies a friendly name or identifier for the domain join configuration 150 as a whole. A user can type or enter this domain join configuration identifier. The management service 120 can check to ensure uniqueness. If the domain join configuration identifier entered in the user interface element 406 is not unique, a warning icon can be displayed relative to the user interface element 406.

The domain join configuration user interface 403 can include a user interface element 409 that identifies a domain type. The domain type can specify a type of domain associated with a particular enterprise directory service 175 and version, such as on-premises Active Directory®, Azure®, on-premises Active Directory® federated with Azure®, FreeIPAR, OpenLDAP®, or another type of domain. A protocol such as LDAP can be specified in the type of domain, such as LDAP-based Active Directory® or LDAP-based directory service.

A user can enter the domain type through the user interface element 409, or the field can be auto-filled using a domain type utilized by the enterprise, or the user can select the domain type from a list such as a dropdown list. The list can be populated using a set of domain types supported by the management service 120. The list can also be populated to include a set of domain types utilized by the enterprise. The management service 120 can query a portion of the data store 118 to identify the set of domain types from domain information provided or entered for the enterprise for other enterprise management purposes.

The domain join configuration user interface 403 can include a user interface element 412 that identifies a domain server name, network address, or another domain server identifier. A user can enter the domain server identifier through the user interface element 412, the field can be auto-filled using a domain server 173 utilized by the enterprise. The domain server identifier can include an Internet Protocol (IP) address, a Uniform Resource Link (URL), a Uniform Resource Identifier (URI), or another network address or portion of a network address that can be utilized for communications with a domain server 173 and the enterprise directory service 175. Additionally, or alternatively, the domain join configuration user interface 403 can include a user interface element 415 that enables a user to enter or select a friendly identifier that can be used to identify the network address and other communication information for the domain server 173 and the enterprise directory service 175.

The domain join configuration user interface 403 can include a user interface element 418 that specifies a customizable device name format or naming convention for the domain join configuration 150. The device name format can be a format that is supported by the enterprise directory service 175. The device name format can be a format that is used for device objects 179 maintained by the enterprise directory service 175, or any user-specified format associated with the particular domain join configuration 150. The device name format can enable the management service 120, the management connector service 171, or the enterprise directory service 175 to generate appropriately formatted unique identifiers for each device 106 that is ultimately assigned to use the domain join configuration 150.

The domain join configuration user interface 403 can include a user interface element 421 that when selected, provides interface elements to specify whether a DNS server is enabled or disabled; an encryption type, a version of a protocol to use; whether server account credentials are enabled or disabled; an authentication type such as anonymous, basic, digest, Kerberos, New Technology LAN Manager (NTLM), or GSS-Negotiate among others; a username, password, and other enterprise directory credentials 152 capable of creating device objects 179 and verifying user objects 177 and organizational units 181 using the enterprise directory service 175.

The domain join configuration user interface 403 can include user interface elements to save the domain join configuration 150 according to the parameters entered and shown in the domain join configuration user interface 403. The domain join configuration user interface 403 can include user interface elements to save and move to a domain assignment user interface to assign the domain join configuration 150 to accounts 145, groups 146, user objects 177, and organizational units 181.

Figure 5:
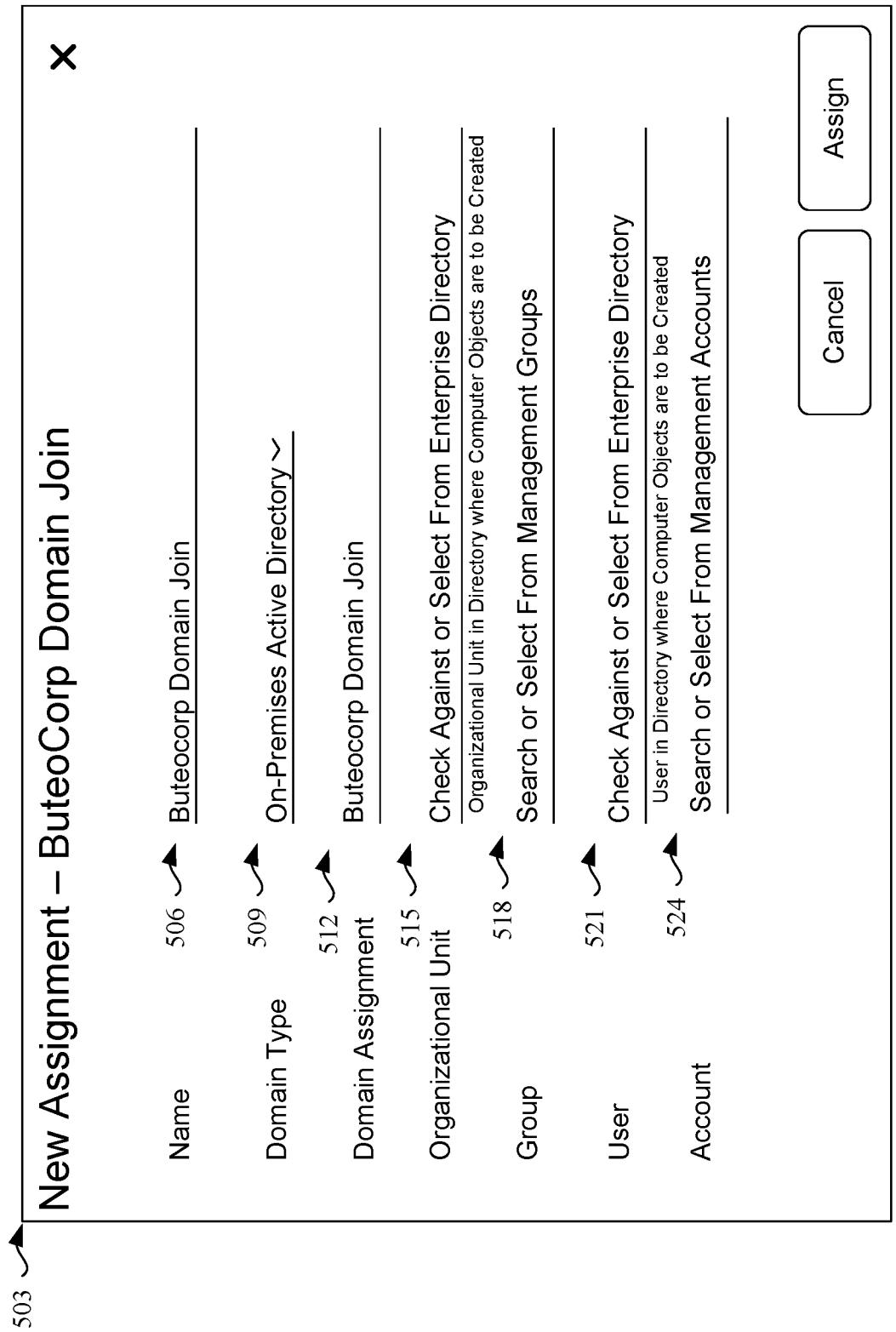
FIG. 5 is a drawing depicting an example of another user interface for management service domain join orchestration, according to the present disclosure.

FIG. 5 illustrates a domain assignment user interface 503 of the management service 120. The domain join configuration user interface 503 can include a user interface element 506 that identifies a friendly name or identifier for the domain join configuration 150 as a whole. A user can type or enter or select this domain join configuration identifier using the user interface element 506. The management service 120 can check to ensure that the domain join configuration identifier is associated with an existing domain join configuration 150. If the domain join configuration identifier is unassociated with an existing domain join configuration 150, a warning icon can be displayed relative to the user interface element 506.

The domain assignment user interface 503 can include a user interface element 509 that identifies a domain type. The domain type can specify a type of domain associated with a particular enterprise directory service 175 and version. This domain type can be entered based on the domain join configuration 150 associated with the domain join configuration identifier entered or selected using the user interface element 509.

The domain assignment user interface 503 can include a user interface element 512 that identifies a domain assignment name or identifier. The domain assignment name can include a friendly name for the domain assignment. A domain assignment can refer to a deployment or roll out of a particular domain join configuration 150 to a specified set of accounts 145, groups 146, user objects 177, and organizational units 181.

The domain assignment user interface 503 can include a user interface element 515 that identifies an organizational unit 181. A user can enter or select an organizational unit identifier through the user interface element 515. When a character is entered through the user interface element 515, a list of identifiers for existing organizational units 181 can be displayed within or relative to the user interface element 515. The management service 120 can use the management connector service 171 to query the specified enterprise directory service 175 for organizational units 181 that start with or include the character or character string entered through the user interface element 515. The management service 120 can populate the list of existing organizational units 181.

The domain assignment user interface 503 can include a user interface element 518 that identifies a group 146. A user can enter or select a group identifier through the user interface element 518. When a character is entered through the user interface element 518, a list of existing groups 146 can be displayed within or relative to the user interface element 518. The management service 120 can populate the list of groups 146 from the data store 118.

The domain assignment user interface 503 can include a user interface element 521 that identifies an end user based on a user object 177. An administrative user can enter or select a user identifier through the user interface element 521. When a character is entered through the user interface element 521, a list of identifiers for existing user objects 177 can be displayed within or relative to the user interface element 521. The management service 120 can use the management connector service 171 to query the specified enterprise directory service 175 for user objects 177 that start with or include the character or character string entered through the user interface element 521. The management service 120 can populate the list of user objects 177.

The domain assignment user interface 503 can include a user interface element 524 that identifies a group 146. A user can enter or select an account identifier through the user interface element 524. When a character is entered through the user interface element 524, a list of existing accounts 145 can be displayed within or relative to the user interface element 524. The management service 120 can populate the list of accounts 145 from the data store 118.

Stored in the memory device are both data and several components that are executable by the processor. In particular, stored in the one or more memory devices and executable by the device processor can be applications and other executable instructions. Also, stored in the memory can be a data store and other data.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as, object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The devices 106 can include a display upon which a user interface can be rendered. In some examples, the user interface can be generated using user interface data provided by the management computing environment 103 and the enterprise computing environment 112. The device 106 can also include one or more input/output devices that can include, for example, a capacitive touchscreen or other type of touch input device, fingerprint reader, or keyboard.

Although the management services 120, the device connector service, and other various systems described herein can be embodied in software or code executed by general-purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagram(s) and/or flowchart(s) shows examples of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Also, any logic or application described herein that includes software or code can be embodied in any non-transitory computer-readable medium for use by or in connection with an instruction execution system such as, for example, a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

Therefore, the following is claimed:

1. A system, comprising:
    at least one computing device comprising at least one processor; and
    at least one memory comprising instructions executable by the at least one processor, wherein the instructions, when executed by the at least one processor, cause the at least one computing device to at least:
        enroll, by a management service, a device for management;
        identify, by the management service, a domain join configuration for joining the device to a domain within an enterprise firewall, the domain join configuration comprising a domain server identifier of a domain server of the domain and a device name format used by an enterprise directory service of the domain server, wherein the management service operates outside of the enterprise firewall;
        transmit, by the management service to a management connector service within the enterprise firewall, a request to create a device object for the device using the enterprise directory service of the domain server, wherein the request includes the device name format and the domain server identifier;
        receive, by the management service from the management connector service, a domain join blob; and
        transmit, by the management service, the domain join blob to the device, wherein the domain join blob enables the device to join the domain of the domain server.

2. The system of claim 1, wherein the instructions, when executed by the at least one processor, cause the at least one computing device to at least:
    associate, by the management service, the domain join configuration with a device identifier of the device.

3. The system of claim 2, wherein the instructions, when executed by the at least one processor, cause the at least one computing device to at least:
    receive, by the management service, an enrollment request or an activation request comprising the device identifier.

4. The system of claim 1, wherein the instructions, when executed by the at least one processor, cause the at least one computing device to at least:
    receive, by the management service, an enrollment request comprising enterprise directory user credentials; and
    confirm, by the management service, that the enterprise directory user credentials are associated with a user object of the enterprise directory service, wherein the request to create the device object is transmitted based on the enterprise directory user credentials being associated with the user object.

5. The system of claim 1, wherein the request to create the device object comprises enterprise directory credentials that provide authorization to create the device object using the enterprise directory service.

6. The system of claim 1, wherein the instructions, when executed by the at least one processor, cause the at least one computing device to at least:
associate, by the management service, the domain join configuration with a group of the management service.

7. A non-transitory computer-readable medium comprising instructions executable by at least one processor, wherein the instructions, when executed by the at least one processor, cause at least one computing device to at least:
enroll, by a management service, a device for management;
identify, by the management service, a domain join configuration for joining the device to a domain within an enterprise firewall, the domain join configuration comprising a domain server identifier of a domain server of the domain and a device name format used by an enterprise directory service of the domain server, wherein the management service operates outside of the enterprise firewall;
transmit, by the management service to a management connector service within the enterprise firewall, a request to create a device object for the device using the enterprise directory service of the domain server, wherein the request includes the device name format and the domain server identifier;
receive, by the management service from the management connector service, a domain join blob; and
transmit, by the management service, the domain join blob to the device, wherein the domain join blob enables the device to join the domain of the domain server.

8. The non-transitory computer-readable medium of claim 7, wherein the instructions, when executed by the at least one processor, cause the at least one computing device to at least:
associate, by the management service, the domain join configuration with a device identifier of the device.

9. The non-transitory computer-readable medium of claim 8, wherein the instructions, when executed by the at least one processor, cause the at least one computing device to at least:
receive, by the management service, an enrollment request or an activation request comprising the device identifier.

10. The non-transitory computer-readable medium of claim 7, wherein the instructions, when executed by the at least one processor, cause the at least one computing device to at least:
receive, by the management service, an enrollment request comprising enterprise directory user credentials; and
confirm, by the management service, that the enterprise directory user credentials are associated with a user object of the enterprise directory service, wherein the request to create the device object is transmitted based on the enterprise directory user credentials being associated with the user object.

11. The non-transitory computer-readable medium of claim 7, wherein the request to create the device object comprises enterprise directory credentials that provide authorization to create the device object using the enterprise directory service.

12. The non-transitory computer-readable medium of claim 7, wherein the instructions, when executed by the at least one processor, cause the at least one computing device to at least:
associate, by the management service, the domain join configuration with a group of the management service.

13. A method performed by instructions executed by at least one processor of at least one computing device, the method comprising:
enrolling, by a management service, a device for management;
identifying, by the management service, a domain join configuration for joining the device to a domain within an enterprise firewall, the domain join configuration comprising a domain server identifier of a domain server of the domain and a device name format used by an enterprise directory service of the domain server, wherein the management service operates outside of the enterprise firewall;
transmitting, by the management service to a management connector service within the enterprise firewall, a request to create a device object for the device using the enterprise directory service of the domain server, wherein the request includes the device name format and the domain server identifier;
receiving, by the management service from the management connector service, a domain join blob; and
transmitting, by the management service, the domain join blob to the device, wherein the domain join blob enables the device to join the domain of the domain server.

14. The method of claim 13, further comprising:
associating, by the management service, the domain join configuration with a device identifier of the device.

15. The method of claim 14, further comprising:
receiving, by the management service, an enrollment request or an activation request comprising the device identifier.

16. The method of claim 13, further comprising:
receiving, by the management service, an enrollment request comprising enterprise directory user credentials; and
confirming, by the management service, that the enterprise directory user credentials are associated with a user object of the enterprise directory service, wherein the request to create the device object is transmitted based on the enterprise directory user credentials being associated with the user object.

17. The method of claim 13, wherein the request to create the device object comprises enterprise directory credentials that provide authorization to create the device object using the enterprise directory service.

* * * * *